United States Patent [19]

Curran

[11] 4,190,848
[45] Feb. 26, 1980

[54] INDUSTRIAL PROCESS RECORDER INCORPORATING IMPROVED ROLL CHART ASSEMBLY

[75] Inventor: John R. Curran, Attleboro, Mass.

[73] Assignee: The Foxboro Company, Foxboro, Mass.

[21] Appl. No.: 879,301

[22] Filed: Feb. 21, 1978

[51] Int. Cl.² ............................................. G01D 15/00
[52] U.S. Cl. ..................................... 346/145; 346/136
[58] Field of Search ................................ 346/136, 145

[56] References Cited
U.S. PATENT DOCUMENTS

| | | | |
|---|---|---|---|
| 3,186,000 | 5/1965 | Sihvonen et al. | 346/136 X |
| 3,922,688 | 11/1975 | Bates et al. | 346/145 X |
| 4,127,858 | 11/1978 | Schiller | 346/145 X |

*Primary Examiner*—George H. Miller, Jr.
*Attorney, Agent, or Firm*—Andrew T. Karnakis

[57] ABSTRACT

An industrial process recording instrument includes a roll chart cassette assembly that is readily removable from the instrument to accommodate replacement of the chart record. The replacement chart record is furnished on a supply roll insertable in one place of the cassette, while the lead end of the chart record is fixedly presecured to a take-up roll insertable in another place of the cassette, in such disposition that the longitudinal axis of the chart record is exactly perpendicular to the axis of the take-up roll. Thus the roll chart can be easily installed while the cassette is being hand-held in near-perfect alignment, thereby effectively minimizing the possibility of paper jams as the chart record is fed along the cassette.

4 Claims, 3 Drawing Figures

INDUSTRIAL PROCESS RECORDER INCORPORATING IMPROVED ROLL CHART ASSEMBLY

FIELD OF THE INVENTION

This invention relates to industrial process recording instruments for recording the values of process variables such as flow rate or temperature. More particularly, this invention relates to improvements in such apparatus to provide ease of replacement of chart records and improved chart record feed characteristics.

BACKGROUND OF THE INVENTION

Industrial recorders using roll chart paper have been used to monitor process variables for many years. Typically these recorders have contained roll charts six to seven inches wide to accommodate multiple process measurements, positioned so that the just-completed chart record extends across the front face of the device. In order to change a roll, the instrument first is pulled out partially from the control panel. Upon opening the front face of the instrument, the completed roll chart is removed and a new supply roll is inserted into a mating receptable. A small amount of chart paper is then unwound from the supply roll and attached by tape or otherwise to a take up spool located directly below and parallel to the supply roll. Thus, the removal and replacement of roll charts for such prior art devices is accomplished with the recorder being essentially in situ.

As processes have become increasingly complex, there has been greater need to integrate and display process information more effectively for control room operators. Control rooms typically display such data on large panels (fifty feet or more in length), and the total cost per square foot associated with these control panels is quite high.

Accordingly, the size of process instruments has been drastically reduced in the past few years to increase the amount of process information displayed for a given control panel layout. For example, the width of industrial recorders has in recent years been cut nearly in half. Of course, such dimensional modifications require significant design changes in chart paper feeding mechanisms and display techniques. Along with changes in the mechanical design, there has also been parallel efforts to reduce the electrical energy consumption of the instruments, thereby resulting in the use of relatively low-power motors to drive both the pens and the chart record.

In certain of the process recorders, the entire chart record is contained on a removable unit commonly referred to as a cassette. Such a unit is advantageously positioned within the instrument so that a sizeable length of just-completed chart record extends along one entire side wall of the instrument, thereby increasing the amount of historical trend data which an operator can view when the recorder is partially withdrawn from the panel.

To simplify the instrument design, it is preferable that the cassette be arranged so that, when the chart record is due for replacement, the cassette is removed entirely from the instrument before carrying out the procedure incident to replacing the chart. This has created a special problem since the control room typically does not have a readily-available, close-by work bench or the equivalent on which the cassette can be placed while being worked on to install the replacement chart record. Since control room operators often monitor numerous complex, critical processed by themselves for long periods of time, this chart replacement procedure must be accomplished in a minimum amount of time. Thus the overall cassette arrangement, and the replacement roll chart to be installed therein, must be designed to permit installation with one hand while the cassette is being held in the other hand, while the control room operator is still able to keep track of various process conditions.

Still another problem frequently presented in roll chart recorders of the cassette-type is the possiblity of paper jams due to misalignment between the paper roll and the paper feed mechanism. This problem is aggravated by the relatively long distances over which the paper is fed and also by the energy-efficient, low-power chart drive systems which often cannot overcome even the slightest irregularities associated with paper rewind. To some extent, this situation can be alleviated by providing mechanical paper chart guides at strategic places along the feed path. However, such guiding devices do not present a perfect solution to the problem, and moreover they increase the overall dimensions of the equipment which is especially undesirable in modern applications requiring instruments with minimum size.

SUMMARY OF THE INVENTION

The present invention overcomes the foregoing problems and limitations by providing a recording instrument with a roll chart cassette assembly wherein the chart record is furnished on a supply roll, in the usual fashion, but wherein the lead end of the chart record is fixedly presecured to a take-up roll, in such disposition that the longitudinal axis of the chart record is exactly perpendicular to the take-up roll axis. Thus the roll chart record can be loaded into the cassette with only one hand while the other hand is used to hold the cassette structure. Moreover, the permanent preattachment of the chart record to the take-up roll, as by means of precision production equipment at the factory, assures near-perfect alignment between the edges of the chart record and the paper feed mechanism in the cassette thus eliminating or significantly reducing any need for paper guiding devices.

PREFERRED EMBODIMENT

A description of the presently preferred form of the invention is set forth below.

DRAWINGS

DESCRIPTION

Figure 1:
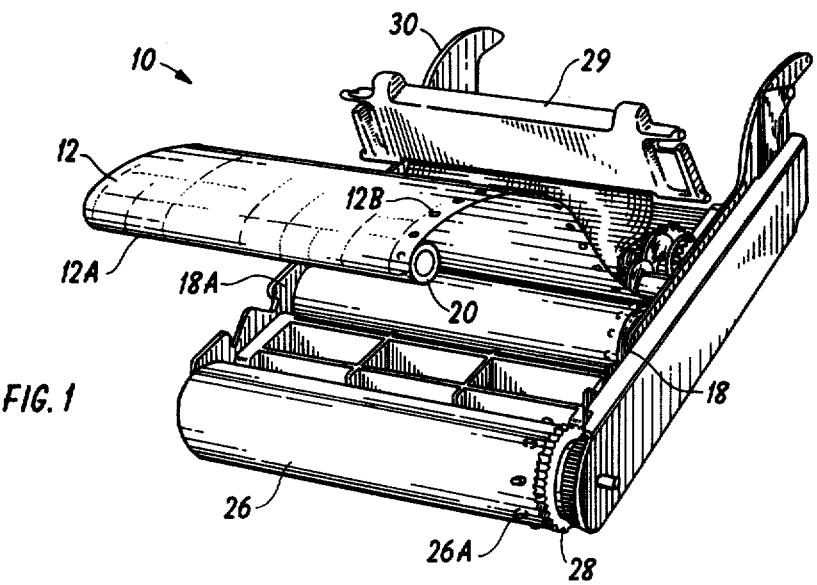
FIG. 1 is a perspective view of a roll chart cassette of an industrial process control recording instrument embodying the improved chart record of the present invention.
Figure 2:
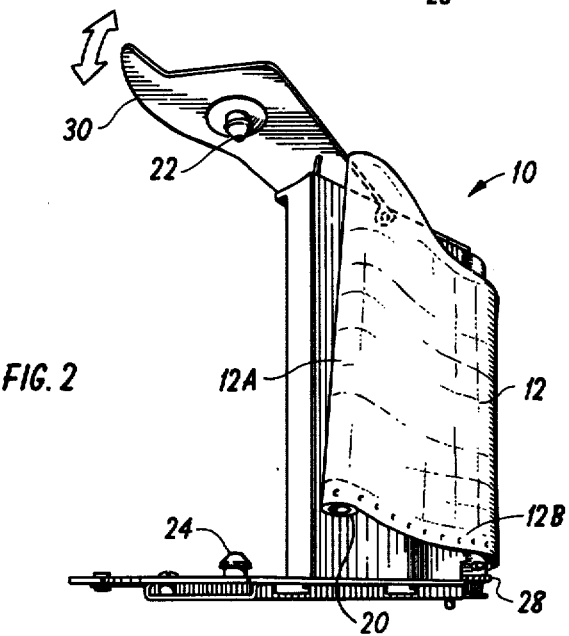
FIG. 2 is another perspective view of the cassette assembly of FIG. 1 illustrating the ready replacement of the roll chart record in accordance with the present invention.

With reference to the drawings, FIGS. 1 and 2 show a roll chart cassette 10 which provides a moving chart record 12 for use with an industrial process control recorder of the type disclosed in copending application Ser. No. 771,544, filed by J. R. Curran et al on Feb. 24, 1977, and assigned to the same assignee as this application. Such recording apparatus form a narrow-width, elongate assembly which are mounted in a control room panel together with other instruments, and which present to the control room operator through their front face a portion of the moving chart record. Furthermore, such instruments are mounted within the panel so as to be easily pulled out at least partially therefrom, thereby accommodating ready removal of the entire cassette from the recorder. Specific reference to the aforementioned copending application should be made for more detailed information on the operation of the recorder, as the following description will only discuss those aspects necessary for an understanding of the present invention.

The chart record 12 is carried on the cassette 10, and an electrical motor drive arrangement, which is well known to those skilled in the art, drives the chart record at a constant speed when the cassette is fixedly engaged within the recorder. The entire cassette is pivotally supported within the recorder so that the cassette when grasped firmly may be swung out from the instrument chassis. In this position, the cassette is readily removed from the recorder in conventional manner by simply releasing a retaining latch (not shown).

Figure 3:
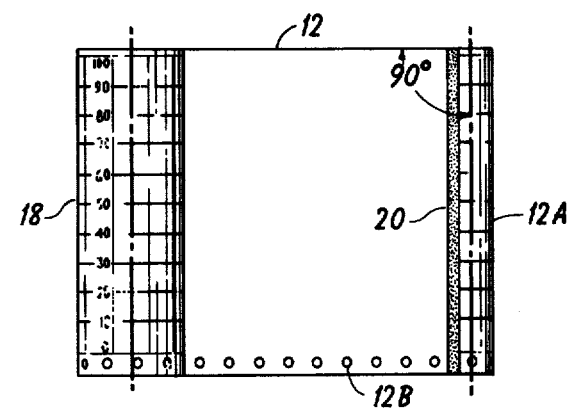
FIG. 3 is an elevation view of the improved chart record of the invention showing the precise alignment of the take-up roll to the supply roll.

With the cassette 10 held in one hand, a replacement chart record may be easily and precisely installed with the other hand by first placing a fresh supply roll 18 (i.e., the roll on which the bulk of the chart record 12 is initially wound) in a receptacle 18A. The lead end 12A of the chart record is fixedly presecured by a suitable adhesive to a tubular cardboard take-up roll 20 such that the longitudinal axis of the chart record is exactly perpendicular to the axis of the take-up roll (see FIG. 3).

A portion of the chart record 12, sufficient to extend around the opposite side of the cassette 10 to where the take-up roll 20 is received at a pair of co-axial spindles 22, 24, is then unwound from the supply roll 18. The chart record extends over a drive-drum 26, with the perforated bottom portion 12B of the chart record engaging a series of sprockets 26A formed on the drum. The drive-drum is in turn linked to the chart drive by a gear wheel 28 coupled to the bottom of the drum. After the chart record has been positioned on the drum, a retaining strap 29 covers the supply roll to hold it in place.

Turning now more specifically to FIG. 2, the chart record replacement is completed by lifting the cassette's hinged top plate 30 and mounting the take-up roll 20 on the respective spindles 22, 24. Turning the gear wheel 28 in the opposite direction from its normal drive rotation rewinds the supply roll 18 and causes the chart record to lie flat on the cassette 10. The bottom spindle 24, which is coupled to the chart drive, winds the completed chart record on the take-up roll. Because the lead end 12A of the chart record is squarely aligned with the take-up roll, the completed chart record will wind uniformly on the take-up roll, thereby effectively minimizing the possibility of paper jams as the chart record is fed along the cassette.

Precision alignment of the chart record may be advantageously performed in the factory as the desired supply of chart record is wound in customary fashion on tubular cardboard rolls. For economy of manufacture, the cardboard rolls used with the supply and take-up portions of the chart record are identical. All that is required to assure the proper angular relation between the various components is to provide a fixture on the winding apparatus that incorporates means for holding the axis of the supply roll exactly perpendicular to a reference side of the fixture. The chart record is then kept flush with the reference side while the take-up roll is also held squarely against an adjacent segment of the reference side by an orthogonal spoke. The leading edge of the chart record is then glued to the take-up roll. Notwithstanding the desireability of constructing the improved chart record of the present invention in a single manufacturing process, even any simple hand-held fixture which maintains the chart record and associated rolls in their proper angular relation may be employed.

It is to be understood that the above detailed description is but one embodiment of the invention, and that various changes may be made by those skilled in the art without departing from the spirit and scope of the invention as defined in the accompanying claims.

What is claimed is:

1. An industrial process recording instrument of the type utilizing a moving chart record and comprising:
   an elongate chassis to be mounted as part of a control room panel together with other instruments and having a front face for presenting to the control room operator a portion of the moving chart record on which at least one process variable is recorded during instrument operation;
   said instrument being adapted to be mounted in said panel so as to accommodate ready pull-out of said chassis at least partially from the panel;
   an elongate roll chart cassette within said chassis with at least one long side of the contained roll chart having a perforated edge portion and being disposed parallel to the longitudinal axis of said recording instrument;
   means mounting said cassette within said instrument to provide for ready removal of the cassette while said instrument has been withdrawn at least partially from said control panel;
   said cassette including chart record replacement means wherein in one place of said cassette a supply roll on which the bulk of said chart record is initially wound is located and in another place a take-up roll presecured to the lead end of said chart record is positioned such that when said cassette is mounted in said chassis said chart record replacement means is automatically ready to permit markings to be placed thereon during instrument operation;
   said lead end of said chart record being fixedly presecured to said take-up roll with the longitudinal axis of said chart record exactly perpendicular to the axis of said take-up roll;
   means for driving the roll chart such that the chart record advances at a constant speed, said drive means including a sprocketed drive drum for engaging said perforated edge portion; and,
   means for rotating said take-up roll, whereby said roll chart is wound uniformly on said take-up roll.

2. Apparatus as claimed in claim 1, wherein said chart record is freely and uniformly wound on said supply roll so that, as the recording progresses to completion, the entire chart can be wound onto said take-up roll and thereafter removed for storage or study.

3. Apparatus as claimed in claim 1, wherein said take-up roll is formed of inexpensive, pressed fiber-board material.

4. Apparatus as claimed in claim 3, wherein said lead end of said chart record is glued to said take-up roll.

* * * * *